W. J. KIMBROUGH.
MEANS FOR CONNECTING LINES TO FISHING FLOATS.
APPLICATION FILED MAY 7, 1910.
1,010,499.
Patented Dec. 5, 1911.
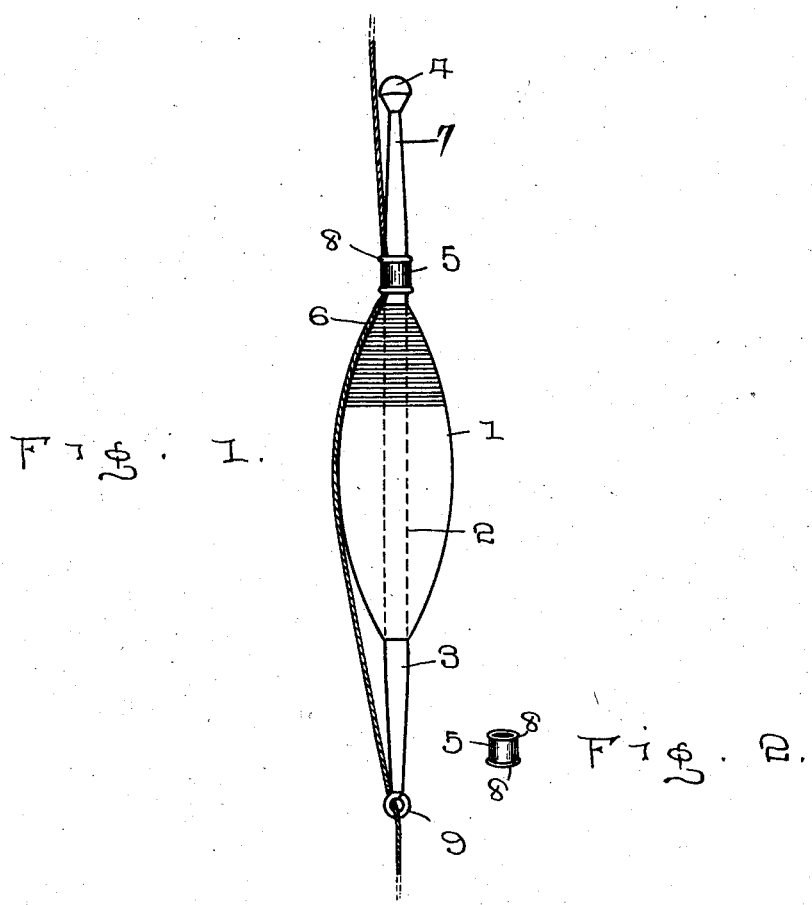
Witnesses
Inventor
W. J. Kimbrough
by W. J. Fitzgerald
Attorneys

UNITED STATES PATENT OFFICE.

WILLIAM J. KIMBROUGH, OF RICHMOND, VIRGINIA.

MEANS FOR CONNECTING LINES TO FISHING-FLOATS.

1,010,499.       Specification of Letters Patent.     Patented Dec. 5, 1911.

Application filed May 7, 1910. Serial No. 559,949.

*To all whom it may concern:*

Be it known that I, WILLIAM J. KIMBROUGH, a citizen of the United States, residing at Richmond, in the county of Henrico and State of Virginia, have invented certain new and useful Improvements in Means for Connecting Lines to Fishing-Floats; and I do hereby declare the following to be a full, clear, and exact description of the invention, such as will enable others skilled in the art to which it appertains to make and use the same.

My invention relates to new and useful improvements in means for connecting lines to fishing floats and the object of the invention is to provide a removable staff for the float having a tapered upper end terminating in an enlarged head, said staff carrying a thimble or ring adapted to engage and hold the line to which the float is attached in fixed relation with the float.

With this object in view, the invention consists in the improved construction, arrangement and combination of parts which will be hereinafter fully described and afterward specifically claimed.

In the accompanying drawings which are made a part of this application, Figure 1 is an elevation of the float as applied to use, and Fig. 2 is a perspective view of the thimble removed from the staff.

Referring to the drawings in which similar reference numerals designate corresponding parts throughout the several views, 1 indicates the float, which is constructed in the usual or any preferred manner and has extending through its longitudinal center an opening 2, through which is extended a staff 3, said staff snugly fitting said opening and projecting beyond each end of the float, the upper end of the staff being tapered or reduced in thickness and terminating in a head 4, which is greater in diameter than the opening through the float.

Upon that end of the staff 3 which projects above the float 1 is a thimble 5, preferably formed of metal, through which extends the line 6 held against movement through the thimble by the binding action of the thimble against the staff. When it is desired to adjust the float on the line, the thimble is moved to the reduced portion 7 of the staff, thereby permitting the line to move freely through the thimble, and when the float has been properly adjusted on the line the thimble is moved to that portion of the upper projecting end of the staff which is of normal size, thereby squeezing the line between the thimble and staff.

On the ends of the thimble are formed beads 8 which facilitate the handling of the thimble and prevent the line being cut or mutilated when moving the thimble upwardly or downwardly on the staff. The lower end of the staff is provided with an eye 9, through which the line is passed, the size of the eye being such as to permit the line to pass loosely therethrough.

In applying the staff to the float, the eye 9 is removed and the lower end of the staff introduced through the opening in the float and when the staff has been moved to the proper position in the float the eye is again returned into the lower end thereof. The thimble being on the reduced, tapered end of the staff between the head 4 and the float, the end of the line can be freely moved through the thimble and thence through the eye at the lower end of the staff and after the float has been properly adjusted upon the line, the thimble is moved downwardly until it engages a portion of the staff on which it will snugly fit. In this position, the line is securely held and any downward pull on the line will cause the thimble to more tightly bind the line. The float can be quickly adjusted in either direction upon the line, or the thimble adjusted to the larger portion of the staff to hold the float against longitudinal movement on the line and while thus permitted to move freely, the thimble cannot be lost off the upper end of the float, and will be prevented from leaving the staff until the staff is removed from the float.

Having thus described my invention, what I claim as new is:

A device of the character described comprising a body having a central opening therethrough, a staff seated in the opening and projecting from both ends of the body, the upper projecting end of the staff being tapered outwardly from the staff and terminating in a head of a diameter greater than that of the opening of the body, a thimble on the tapered projecting upper end of the staff having its central opening of a diameter less than the diameter of the head, said thimble fitting loosely on the smaller portion of the staff and snugly on the larger portion, and an eye on the lower projecting end of the staff.

In testimony whereof I have signed my name to this specification in the presence of two subscribing witnesses.

WILLIAM J. KIMBROUGH.

Witnesses:
E. L. PILL,
JAS. W. GENTRY.